No. 683,676. Patented Oct. 1, 1901.
J. W. AYLSWORTH & W. H. MILLER.
APPARATUS FOR DUPLICATING PHONOGRAPHIC RECORDS.
(Application filed July 31, 1900.)
(No Model.)
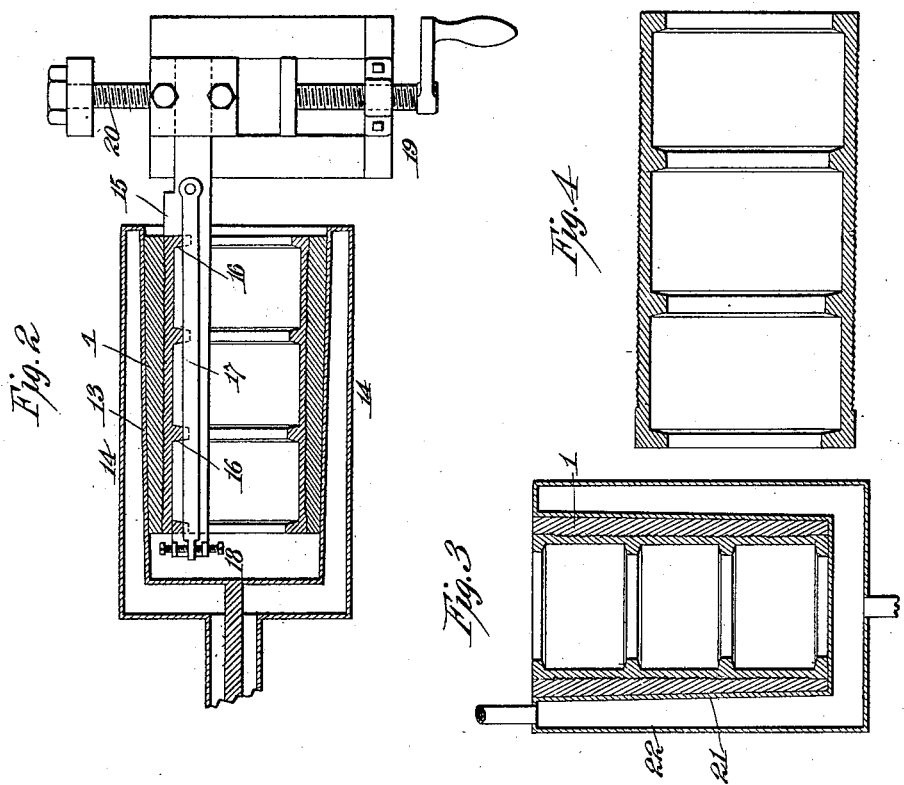
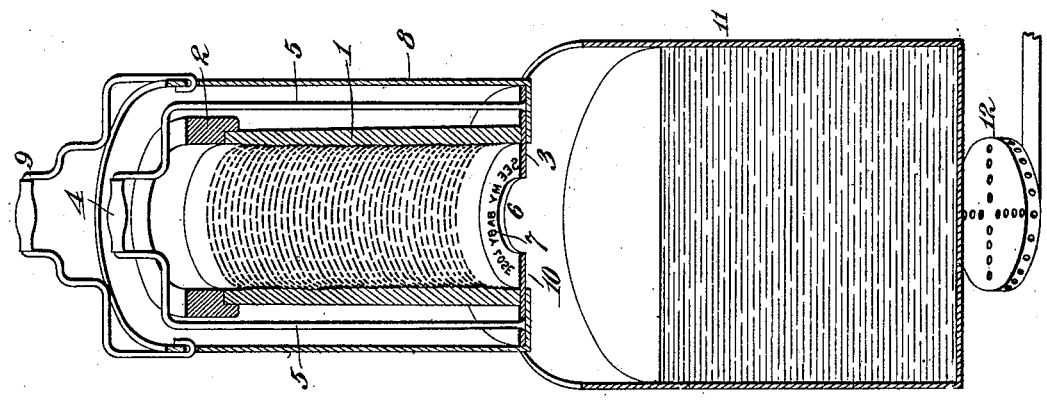
Witnesses:
Inventors:
Jonas Walter Aylsworth
Walter Henry Miller
by Dyer Edmonds & Dyer
Att'ys.

UNITED STATES PATENT OFFICE.

JONAS WALTER AYLSWORTH, OF EAST ORANGE, AND WALTER HENRY MILLER, OF ORANGE, NEW JERSEY, ASSIGNORS TO NATIONAL PHONOGRAPH COMPANY, OF ORANGE, NEW JERSEY.

APPARATUS FOR DUPLICATING PHONOGRAPHIC RECORDS.

SPECIFICATION forming part of Letters Patent No. 683,676, dated October 1, 1901.

Application filed July 31, 1900. Serial No. 25,392. (No model.)

*To all whom it may concern:*

Be it known that we, JONAS WALTER AYLSWORTH, residing at East Orange, and WALTER HENRY MILLER, residing at Orange, in the county of Essex and State of New Jersey, citizens of the United States, have invented a certain new and useful Apparatus for Duplicating Phonographic Records, of which the following is a specification.

Our invention relates to an improved apparatus for duplicating phonographic records. In an application for Letters Patent filed on even date herewith, and numbered serially 25,391, we describe an improved process or method for duplicating phonographic records, which consists in immersing in a bath of molten wax-like coagulable material a matrix or mold which carries on its bore the representation in negative or relief of the record to be duplicated, whereby the molten material will fill the bore of the matrix or mold, but will be excluded from its exterior, the reduced temperature of the matrix or mold relative to the molten material causing the latter to coagulate or chill upon the bore of the matrix until a layer of the desired thickness has been secured, after which the matrix or mold is removed from the bath of molten material and the bore of the duplicate finished by a reaming-tool, the resulting duplicate being finally removed from the matrix or mold by shrinking.

The object of our present invention is to provide an improved apparatus by which the process in question may be expeditiously carried out.

In order that our invention may be better understood, attention is directed to the accompanying drawings, forming a part of this specification, and in which—

Figure 1 is a sectional view of the apparatus and mold in which the deposit or coating of the wax-like material is secured; Fig. 2, a corresponding view of the apparatus for properly reaming the interior of the duplicates; Fig. 3, a similar view of the apparatus employed for the shrinking of the duplicates from the matrix or mold, and Fig. 4 an enlarged corresponding view of one of the resulting duplicates.

In all of the above views corresponding parts are represented by the same numerals of reference.

1 represents a matrix or mold carrying on its bore the representation of the record which is to be duplicated, said representation being obviously in negative or relief. This matrix or mold is made by any approved process and is not a part of our invention.

2 is a metal cap, which is removably fitted upon the upper end of the matrix or mold, with its bore corresponding in diameter with the bore of the matrix or mold.

3 is a metal disk provided with a handle 4, connected to side bars 5 5 and by which the disk may be manipulated. The matrix or mold 1 is carried by the disk 3, as shown. An opening 6 in the disk 3 is of considerably less diameter than the bore of the matrix or mold, and around said opening 6 and within the bore of the matrix or mold the disk may be formed in negative with a representation 7 of suitable words or characters to indicate the subject-matter of the duplicated record, its source of origin, &c.

8 is a sheet-metal receptacle provided with a handle 9 and which carries the disk 3 and the matrix or mold 1, as shown. The receptacle 8 is provided with an opening 10 therein, which may be of the same or of larger size than the opening 6 in the disk 3.

11 represents a tank, which contains, as indicated, a proper supply of suitable wax-like material from which the duplicates are to be made, and which material may be the ordinary commercial phonographic compositions now in use. The material in the tank 11 may be kept in a molten condition by heat applied in any suitable way, as by means of a gas-burner 12.

In carrying out our process with the apparatus so far described we place the matrix or mold on the disk 3 and insert the latter, carrying the matrix or mold in the receptacle 8, as shown, after which the receptacle 8 is immersed in the molten material within the tank 11, which is permitted to enter the matrix or mold to a point above the upper end of the latter, but below the top of the cap 2, so that the material fills the interior of the matrix or mold, but does not overflow the same. The matrix or mold is thus kept immersed in the molten material for the desired time required to secure a deposit of the wax-like material of the required thickness. The reduced temperature of the matrix or mold relative to the temperature of the molten material causes the latter to become coagulated or chilled on the interior of the matrix and to deposit thereon to the thickness desired. This chilling also makes the outer surface of the resulting duplicates much smoother than is the case with duplicates made by a mechanical duplicating process. Owing to the thinness of the walls of the receptacle 8, the metal thereof very quickly attains the temperature of the molten material, so that none of the molten material will accumulate thereon. When the desired deposit of molten material is secured, the receptacle 8 is removed from the bath of molten material and the disk 3, carrying the mold, is removed from said receptacle. Obviously the lower edge of the resulting duplicate will be perfectly true, being formed by the portion of the disk 3 between the opening 6 and the bore of the matrix or mold, and if a representation 7 is formed on that portion of the disk such representation will be cast in the bottom end of the duplicate. The cap 2 is now removed from the matrix or mold and the upper end of the duplicate is trimmed off flush with the upper surface of the matrix or mold by any desired form of cutting-tool. The matrix or mold, which has a slightly-tapered outer surface, is now placed in a tapered chuck 13, as shown in Fig. 2, which chuck is provided with a water-jacket 14, through which cold water may circulate in order that the matrix or mold may be kept cold enough to maintain the resulting duplicate, or at least the outer surface thereof, in a chilled and hardened condition. The chuck 13 being rotated in any suitable way, a reaming-tool 15 is introduced within the same, and by reason of the cut-away portions 16 in said reaming-tool a series of ribs will be formed on the duplicate, as shown in Fig. 4, by which the latter will be properly held upon the mandrel of the reproducing-phonograph in the usual way. The reaming-tool 15 carries on one face an auxiliary cutting-blade 17, as shown, pivoted at one end and adjustable at the other by means of adjusting-screws 18. By changing the inclination of this cutting-blade 17 the depth and taper of the ribs can be regulated with the utmost certainty, so that the record can be accurately fitted to the tapered mandrel of the reproducing instrument. In other words, the ribs which are formed by the cut-away portion 16 of the reaming-tool will by the auxiliary blade 17 be cut to gradually-increasing diameters from one end of the duplicate to the other, so that the duplicate will be frictionally received upon the usual tapered mandrel. The reaming-tool 15 is carried by the usual slide-head 19 of the lathe, and the depth of cut of said tool is limited by a regulating-screw 20, as shown. After the interior of the duplicate has been properly reamed, as explained, the matrix or mold is removed from the chuck 13 and inserted in a cooling-mold 21, having a water-jacket 22, and through which cold water may circulate, the matrix or mold being kept in the cooling-mold until the resulting duplicate has contracted sufficiently to enable it to be removed from the matrix or mold, whereupon the operation will be completed. By reaming the interior of the resulting duplicates, as explained, to form a series of ribs therein the duplicates may be made much thinner than the ordinary original records, and hence more economically, it being of course understood that the material removed by the reaming-tool will be used for the manufacture of subsequent duplicates.

Having now described our invention, what we claim as new, and desire to secure by Letters Patent, is as follows:

1. An improved apparatus for duplicating phonographic records, comprising a receptacle carrying a matrix or mold, the latter having the record in relief on its bore, and an opening in said receptacle concentric with the bore of the matrix or mold, whereby the receptacle with the matrix or mold may be immersed in a bath of molten, wax-like material to fill the bore of the matrix or mold but to be excluded from its exterior, substantially as set forth.

2. An improved apparatus for duplicating phonographic records, comprising a receptacle having an opening in its bottom, a disk carried by the receptacle and having a corresponding opening, and a matrix or mold seated upon said disk with its bore concentric with the opening therein, whereby the receptacle with the matrix or mold may be immersed in a bath of molten, wax-like material to fill the bore of the matrix or mold but to be excluded from its exterior, substantially as set forth.

3. An improved apparatus for duplicating phonographic records, comprising a receptacle having an opening in its bottom, a disk carried by the receptacle and having a corresponding opening, and a matrix or mold seated upon said disk with its bore concentric with the opening therein, whereby the receptacle with the matrix or mold may be immersed in a bath of molten, wax-like material to fill the bore of the matrix or mold but to be excluded from its exterior, the disk being provided between the opening therein and the bore of the matrix or mold with a representation to be molded upon the end of the desired duplicates, substantially as set forth.

4. An improved apparatus for duplicating phonographic records, comprising a receptacle having an opening in its bottom, a matrix or mold seated over said opening and carrying on its bore the representation in relief of the record to be duplicated, and a removable cap carried by the upper end of the matrix or mold, whereby by immersing the receptacle in a bath of molten material the latter may enter the bore of the matrix or mold above the upper end thereof without overflowing to contact with its exterior, substantially as set forth.

5. An improved apparatus for making duplicate phonographic records, comprising a matrix or mold carrying on its bore the representation of the record to be duplicated, a disk upon which said matrix or mold is seated, said disk carrying concentrically within the bore of the matrix or mold a designation of such record, and means for depositing molten material within the matrix or mold and upon said disk, whereby the duplicate record will be formed and its designation be simultaneously cast or impressed upon the end thereof, substantially as and for the purposes set forth.

6. An improved apparatus for duplicating phonographic records, comprising the combination with means for securing a deposit of a wax-like coagulable material upon the bore of a matrix or mold which carries the representation of the record to be duplicated, of means for finishing the interior of the duplicate while the latter is in position within the matrix or mold, substantially as set forth.

7. An improved apparatus for duplicating phonographic records, comprising the combination with means for securing a deposit of a wax-like coagulable material upon the bore of a matrix or mold which carries the representation of the record to be duplicated, of means for forming within the duplicate while the latter is in position in the mold a series of concentric ribs of gradually-increasing diameters from one end of the duplicate to the other, whereby the duplicate may be properly received upon a tapered mandrel, substantially as set forth.

This specification signed and witnessed this 17th day of July, 1900.

JONAS WALTER AYLSWORTH.
WALTER HENRY MILLER.

Witnesses:
JOS. EVANS,
ELIZABETH EVANS.